United States Patent
Baumann (10) Patent No.: US 8,488,293 B2
(45) Date of Patent: Jul. 16, 2013

(54) ELECTRICAL BEARING GROUND DEVICE

(75) Inventor: Jonathan M. Baumann, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 214 days.

(21) Appl. No.: 12/968,482

(22) Filed: Dec. 15, 2010

(65) Prior Publication Data

US 2011/0149459 A1 Jun. 23, 2011

Related U.S. Application Data (60) Provisional application No. 61/288,731, filed on Dec. 21, 2009.

(51) Int. Cl.
*H05F 3/00* (2006.01)
*H01H 47/00* (2006.01)
*H05F 3/02* (2006.01)

(52) U.S. Cl.
USPC .......................... 361/222; 361/220; 361/221

(58) Field of Classification Search
USPC ....................................................... 361/222
See application file for complete search history.

(56) References Cited

U.S. PATENT DOCUMENTS

| | | | |
|---|---|---|---|
| 1,896,264 A | 2/1933 | Weichsel | |
| 1,896,265 A | 2/1933 | Weichsel | |
| 4,515,417 A | 5/1985 | Shiraishi | |
| 4,566,744 A | 1/1986 | Engelenburg et al. | |
| 4,707,157 A * | 11/1987 | Hauslaib | 400/616 |
| 5,010,441 A * | 4/1991 | Fox et al. | 361/221 |
| 5,454,724 A | 10/1995 | Kloeppel et al. | |
| 5,758,404 A | 6/1998 | Baumann et al. | |
| 5,804,903 A | 9/1998 | Fisher et al. | |
| 5,914,547 A | 6/1999 | Barahia et al. | |
| 6,396,179 B2 | 5/2002 | Sorenson et al. | |
| 7,317,270 B2 | 1/2008 | Knauff | |
| 7,339,777 B2 * | 3/2008 | Barnard et al. | 361/212 |
| 7,436,091 B2 | 10/2008 | Thomas | |
| 8,189,317 B2 * | 5/2012 | Oh et al. | 361/221 |
| 2002/0190588 A1 | 12/2002 | Koenigs et al. | |
| 2004/0184215 A1 * | 9/2004 | Oh et al. | 361/220 |
| 2005/0285464 A1 | 12/2005 | Orders et al. | |
| 2007/0013247 A1 | 1/2007 | Tung et al. | |
| 2007/0035194 A1 | 2/2007 | Briesewitz | |
| 2008/0042503 A1 | 2/2008 | Hartkorn et al. | |
| 2008/0238229 A1 | 10/2008 | Iwashima et al. | |

FOREIGN PATENT DOCUMENTS

WO 2007001525 1/2007

* cited by examiner

*Primary Examiner* — Dharti Patel
(74) *Attorney, Agent, or Firm* — Leydig, Voit & Mayer (57) ABSTRACT

An assembly, system and method are provided for discharging a rotating shaft encompassed by a stationary housing. The system includes an annular charge-dissipating component and a biasing element oriented to apply an axial force to the charge-dissipating component, holding it in contact with the shaft and the housing while the shaft is rotating. The biasing element may be a coil spring or a wave spring. A shaft grounding upgrade kit includes a conductive ring member and a cylindrical spring having a diameter that is the same as that of the conductive ring member. The spring constant of the cylindrical spring is such that the spring holds the conductive ring member within the housing in contact with the shaft and the housing. The conductive ring member may be constructed of gray iron and the cylindrical spring is one of a wave spring and a coil spring.

20 Claims, 5 Drawing Sheets

ELECTRICAL BEARING GROUND DEVICE

RELATED APPLICATIONS

This application is based upon and claims the benefit of priority from U.S. Provisional Application No. 61/288,731 by Jonathan M. Baumann, filed Dec. 21, 2009, the contents of which are expressly incorporated herein by reference.

TECHNICAL FIELD

This disclosure relates generally to rotating electrical shafts and, more particularly, to a charge-dissipating device for discharging an electrically charged shaft to prevent damaging discharge through the shaft bearings.

BACKGROUND

The phenomenon of electrical induction, i.e., the interaction between electrical and magnetic fields to generate a force or create current flow, is exploited in a wide number of applications across a substantial range of industries. Indeed, in almost all cases where electrical energy is generated or is converted to physical motion, the power of electrical inductance is employed.

For example, the spinning of a magnetic array within a network of conductors (or the spinning of conductive coils within an array of magnets) generates a current flow that can be harnessed as usable electric power. This principle is at work in generators in industrial applications, automotive applications, municipal power applications, and so on. Conversely, in motor applications, when an electric current is forced through a conductive coil, the magnetic field thus induced interacts with a permanent magnetic field to cause movement of the coils (or the permanent magnets).

While the desired effects of the inductance phenomenon, i.e., the generation of power or the inducement of physical motion, are generally beneficial, there are sometimes also unintended consequences due to parasitic induction. A pertinent example of this is what is sometimes known as shaft charge or shaft discharge. In this situation, a spinning shaft used in a power generation or motor application becomes inductively charged relative to a nearby grounded body, i.e., the motor housing or generator housing. While the static charge thus created is not in itself detrimental, the charge may suddenly dissipate, or arc, through an intermittent path to ground at a certain voltage level. The voltage level at which this occurs is dependent upon many factors, ranging from the humidity of the air to the conductivity of the various components of the machine. However, in most cases, this discharge can be harmful and is generally undesirable.

In particular, the sudden discharge is often at a significant voltage amplitude, albeit of a very brief duration. During this brief high-voltage discharge, the components through which the charge travels may be etched, pitted and even burned. This is because electrical discharge is a nonlinear threshold phenomenon. In other words, the first available conductive path will allow the immediate onset of discharge, which will further diminish the likelihood of the discharge taking any other path, even when those other paths are almost identical. Thus, in analogy to spot welding, the first even marginally suitable discharge path is forced to accommodate the entire discharge, resulting in rapid heating and melting of even the strongest conductive materials. Indeed, even the hardest metallic bearings can be rapidly etched and pitted by this phenomenon.

The possibility of destructive shaft discharge has long been known, and many attempts have been made over the years to eliminate this problem. Although some solutions have been somewhat effective, there has yet to be a solution that is fully effective, economical, and relatively maintenance free.

SUMMARY

In an aspect of the disclosed principles, an assembly is provided for dissipating an electrical charge on a rotating shaft encompassed by a stationary housing. The assembly includes an annular conductive charge-dissipating component used in conjunction with a biasing element oriented to apply an axial force to the annular conductive charge-dissipating component so that the annular conductive charge-dissipating component is held in contact with the shaft and the housing while the shaft is rotating. In an embodiment, the biasing element is a spring, and is further one of a compression coil spring and a compression wave spring.

In another embodiment, a method is provided for grounding a shaft that is rotationally supported within a grounded housing. The method includes positioning a conductive ring within the housing near a free end of the shaft and placing a biasing element within the housing, such that the conductive ring lies between the biasing element and the free end of the shaft with the biasing element being coaxial with the conductive ring and the shaft. Compressing the biasing element against the conductive ring biases the ring against the free end of the shaft, such that the conductive ring is in conductive contact with the housing, thus grounding the shaft.

A shaft grounding upgrade kit is provided in another embodiment for application to a free end of a rotating shaft in order to ground the shaft to a surrounding stationary housing. The kit includes a conductive ring member having a diameter that is approximately the same as the inside diameter of the housing portion surrounding the free end of the shaft and a cylindrical spring having a diameter that is the same as that of the conductive ring member. The spring constant of the cylindrical spring is selected such that compression of the spring against the conductive ring member within the housing is sufficient to hold the ring in contact with the shaft and the housing. The conductive ring member remains rotationally stationary with respect to the housing while the shaft rotates. The conductive ring member may be constructed of gray iron and the cylindrical spring may be one of a wave spring and a coil spring, or may alternatively comprise another type of biasing device as discussed above.

Further aspects and features of the disclosed principles will be appreciated from the following detailed description and the accompanying drawings, of which:

DETAILED DESCRIPTION

This disclosure relates to electrical power use and generation, and the disclosed principles enable an effective and economical solution to bearing charge/discharge in an easy to install and easy to maintain form. The described system and apparatus are usable in a wide range of applications without substantial supply or retrofit costs, including automotive, industrial, and construction power use and generation applications, as well as others. Specific non-limiting examples include industrial and consumer grade electrical power generators, such as stand-alone generators and generators that are part of a larger machine or structure.

Moreover, although the disclosed principles are described relative to a conductive-bearing device by way of example, it will be appreciated that the disclosed principles can also be used in other environments, including environments where more costly ceramic or other insulating bearings are used. In particular, even when discharge through the bearings of the device is prevented via the use of insulating bearings, the potential for damaging discharge through other portions of the device still exists, and may in fact occur at even higher voltages. Thus, the described implementations do not rely on the use of insulating materials, nor do they require the use of any particular bearing or bushing material.

Figure 1:
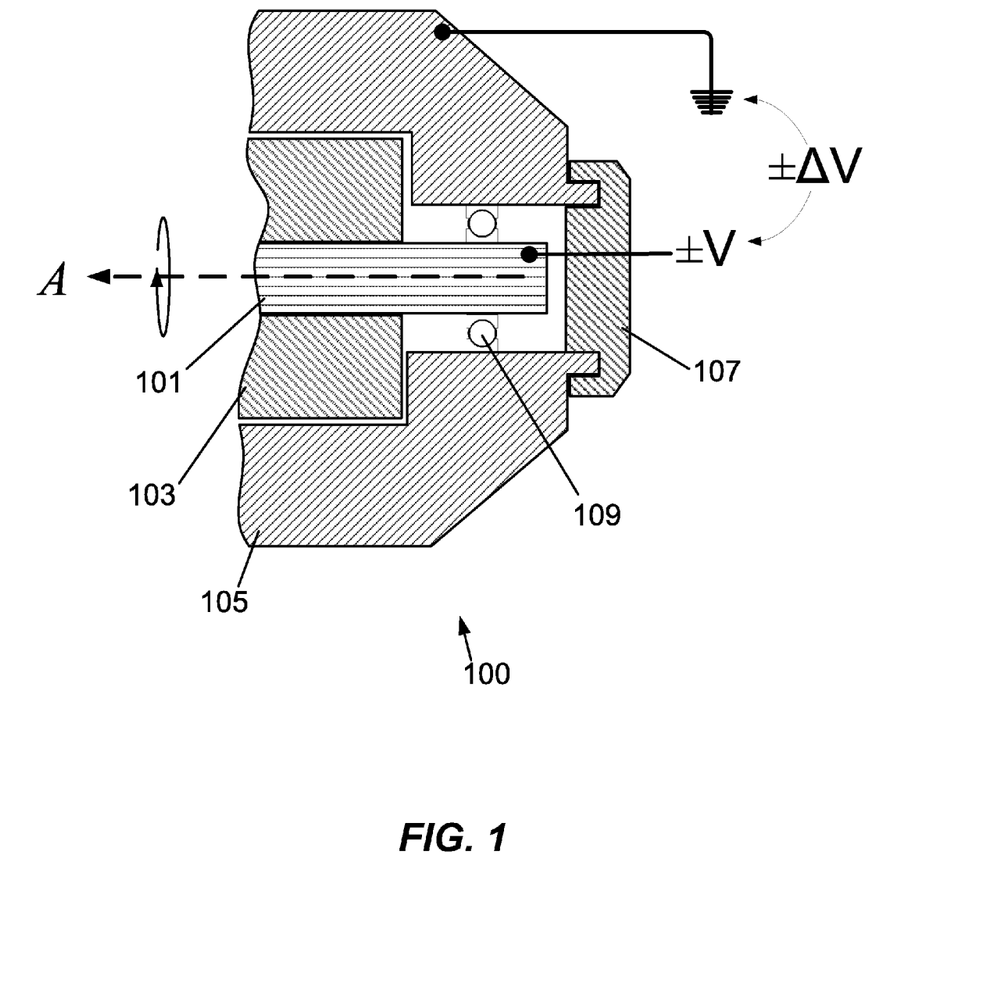
FIG. 1 is a cross-sectional side view through an exemplary generator shaft, showing a spinning shaft environment within which shaft discharge may occur, and within which the disclosed system and method may be implemented.

In overview, FIG. 1 is a partial cross-sectional side view through an exemplary generic generator structure, showing a spinning shaft environment within which a damaging discharge through the generator bearings may occur, and within which the disclosed system and method may be implemented. In greater detail, the generator 100 includes a shaft 101, the shaft 101 being fixed to a rotor 103. The shaft 101, with rotor 103 attached, is spun about an axis A during operation of the generator 100. The rotor 103 may comprise conductive or magnetic elements, or any combination of the two, in addition to any other materials, whether electrically insulating or not.

The shaft 101 is surrounded by a generator housing 105, and is supported within the housing 105 by one or more bearing assemblies 109. The housing 105 typically comprises or encloses a counterpart assembly, not shown, that interacts with the spinning rotor 103 to create electrical energy or to exploit electrical energy to create rotational motion.

The bearing assembly 109 in the illustrated example is a ball bearing assembly. However, it will be appreciated that any suitable bearing or bushing assembly may be used to support the shaft 101, and will typically be selected based on the load levels and directions to which the assembly 109 will be subjected. For example, the imposition of substantial axial loads on the shaft 101, although not typical for this type of environment, will require thrust bearings, whereas more typical radial loads will enable the use of standard radial bearings.

It will be appreciated that the bearing assemblies 109 are typically impregnated or lubricated with a grease or other lubricant to avoid premature wear. While an insulating grease may be used in the bearing assemblies 109 in conjunction with the described system and apparatus, it is not critical that any specific lubrication be used, or indeed that any additional lubrication at all be used.

To isolate the interior of the housing 105 from the ambient environment, an end cap 107 is provided on the housing 105 at at least one end of the shaft 101, this end of the shaft being referred to as its free end. The use of an end cap 107 prevents grease and other materials from exiting the housing 105 during operation, and also prevents the ingress of contaminants, such as dust, grit, and moisture, into the interior of the housing 105. The shaft 101 has an opposite end (not shown) that may be enclosed within the housing 105 by a suitable end cap or other closure or surface, or that may alternatively protrude from the housing 105. Typically, in this situation, the end of the shaft 101 includes a driving or driven element, e.g., a gear or pulley, to couple the shaft 101 to external rotating elements.

As the shaft 101 spins within the housing 105, a positive or negative voltage differential $\Delta V$ may build up over time between the shaft 101, which is at least intermittently electrically isolated, and the housing 105, which is typically permanently grounded, i.e., fixed at zero potential difference relative to the environment outside of the generator 100. While this accumulated potential $\Delta V$ is not in and of itself a damaging force, it will generally reach a magnitude at which it discharges and dissipates, either via an arc or via a marginally conductive path to ground. As noted above, any device components that are in the current flow path when such discharge occurs may be damaged over time. Thus, for example, the bearing assemblies 109 may become increasingly pitted and etched, leading to eventual bearing failure.

Figure 2:
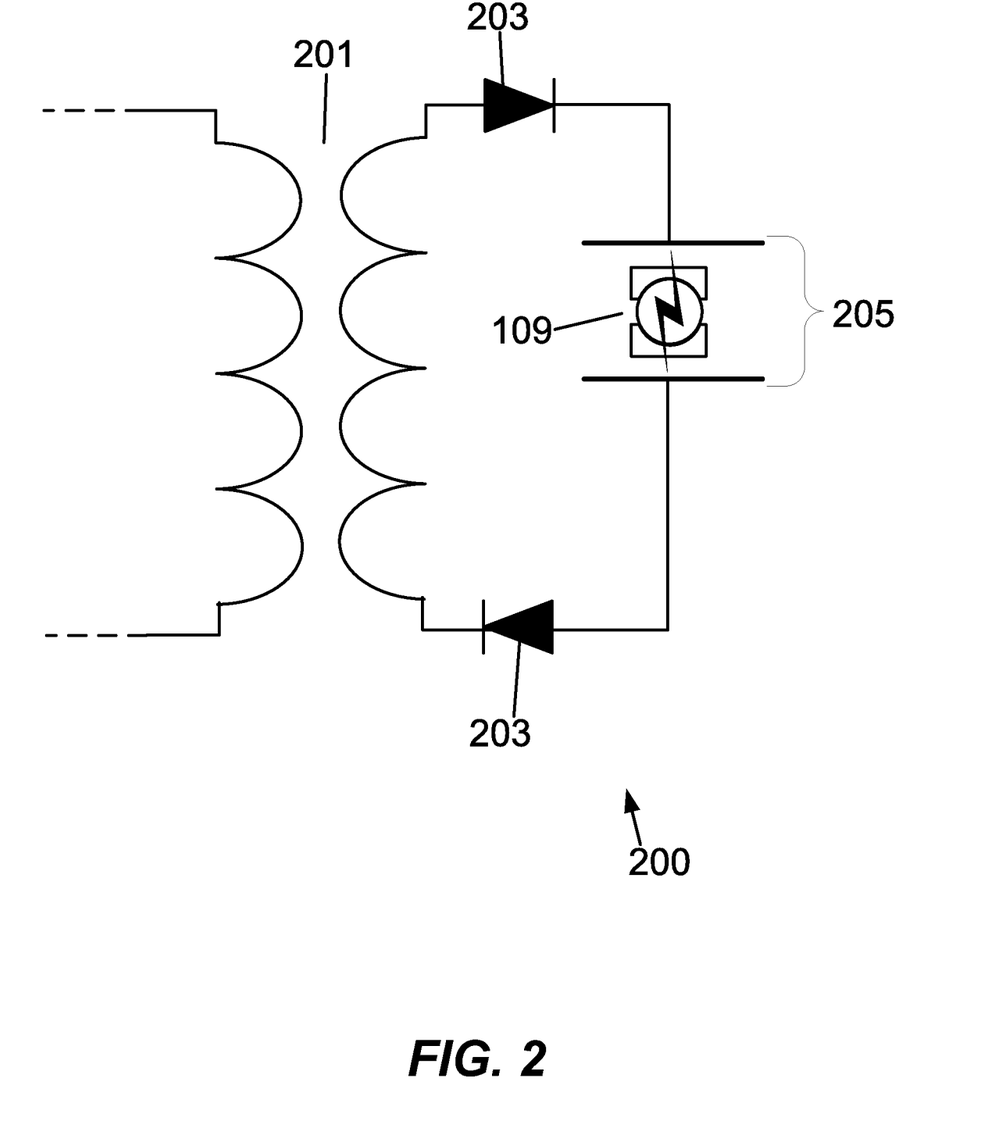
FIG. 2 is a circuit diagram showing an equivalent circuit configuration for the occurrence of shaft charge and discharge in an environment such as that of FIG. 1.

FIG. 2 is a circuit diagram showing an equivalent charge and discharge circuit 200 corresponding to the physical structure of generator 100 of FIG. 1. In particular, an AC voltage differential is induced via inductive coupling between the shaft 101 or rotor 103, and the counterpart element, not shown. This coupling is represented by the coupled inductor structure 201. As the AC voltage differential is applied to the shaft 101, the device structure and rotation serve to preferentially allow charging in one direction. This effect is illustrated via diodes 203. This preferential charging leads to the accumulated voltage differential $\Delta V$ across capacitor 205, representative of the capacitance between the shaft 101 and housing 105. The bearing assembly 109 is illustrated as a discharge path across capacitor 205, to represent the intermittent discharge experienced by the bearing assembly 109.

As noted above, intermittent high voltage discharge is damaging to components of the generator 100 and, in view of this problem, the disclosed system and apparatus provide a compact and easily maintained mechanism whereby the preferential charging voltage differential $\Delta V$ is continually dissipated such that the voltage differential $\Delta V$ is not permitted to accumulate. In this regard, FIG. 3 is a cross-sectional side view through an exemplary generator 300, showing a spinning shaft environment within which the disclosed system and method are implemented.

Figure 3:
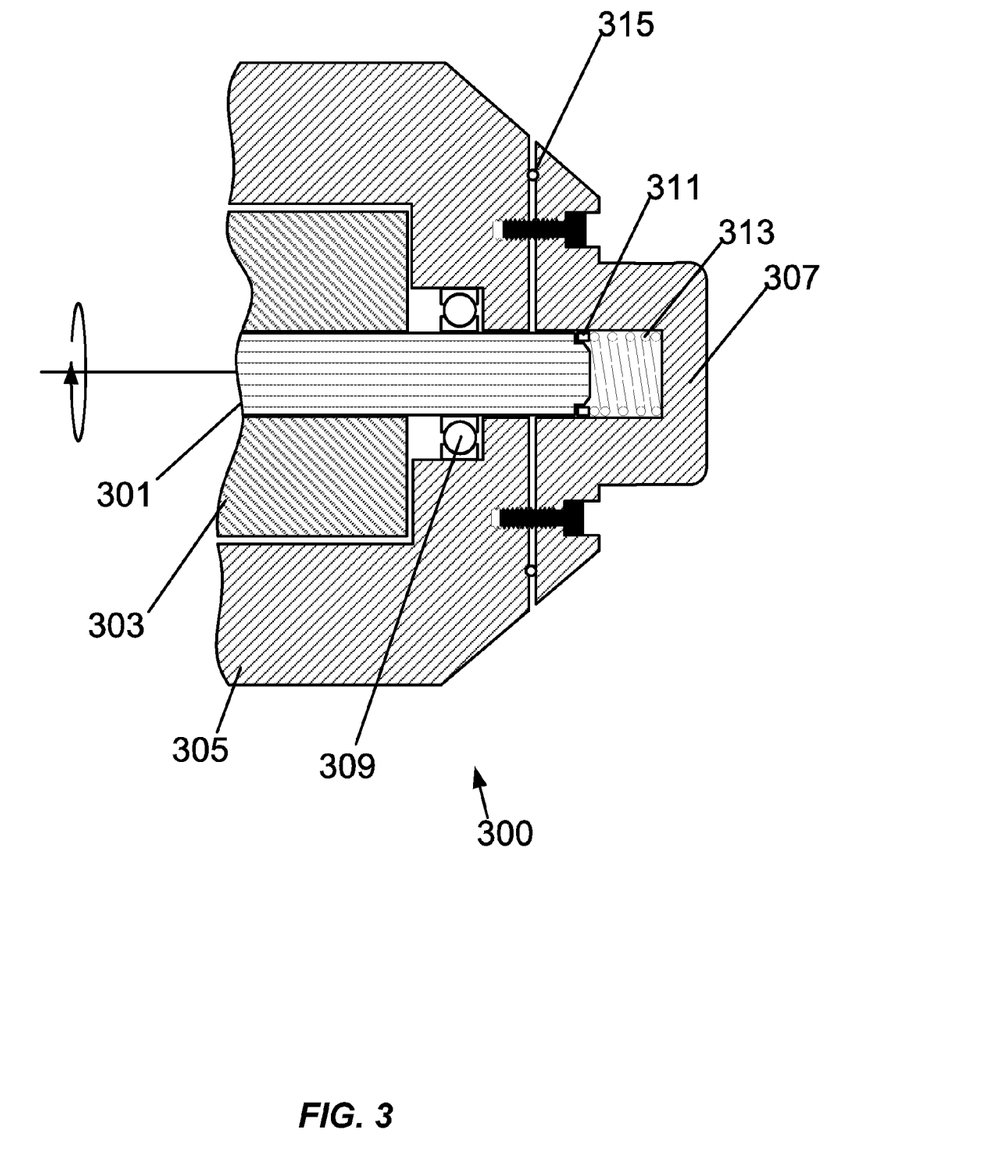
FIG. 3 is a cross-sectional side view through an exemplary generator shaft, showing a spinning shaft environment within which the disclosed system and method are implemented.

In greater detail, the generator 300 of FIG. 3 includes some of the same components as the generator 100 of FIG. 1, such as a shaft 301 fixed to a rotor 303 configured to be spun about an axis A during operation of the generator 300. As with generator 100, the shaft 301 of generator 300 is surrounded by a generator housing 305, and is supported within the housing 305 by one or more bearing assemblies 309. Finally, the housing 305 also typically comprises or encloses a counterpart assembly, not shown, to interact with the spinning rotor 303 to create or exploit electrical energy.

In addition to the elements in common with those of generator 100, the generator 300 also includes an assembly for dissipating an electrical charge from the shaft 300 to prevent gradual charge accumulation followed by sudden discharge through the bearing assembly 309 or other component. In particular, the generator 300 includes a conductive charge-dissipating element, end ring 311, as well as a biasing element, spring 313, oriented and positioned to apply an axial force to the end ring 311 relative to the shaft. In this way, the end ring 311 is held in substantially constant contact with the shaft 301 and the housing 305 while the shaft 301 is rotating. Although the spring 313 is illustrated as a coil spring in FIG. 3, it will be appreciated that other suitable biasing elements may instead be used, and may in some cases be better suited for a particular application. Various alternative biasing elements will be described in conjunction with a more detailed explanation of the construction and configuration of the shaft 301, end ring 311, and housing 305.

Figure 4:
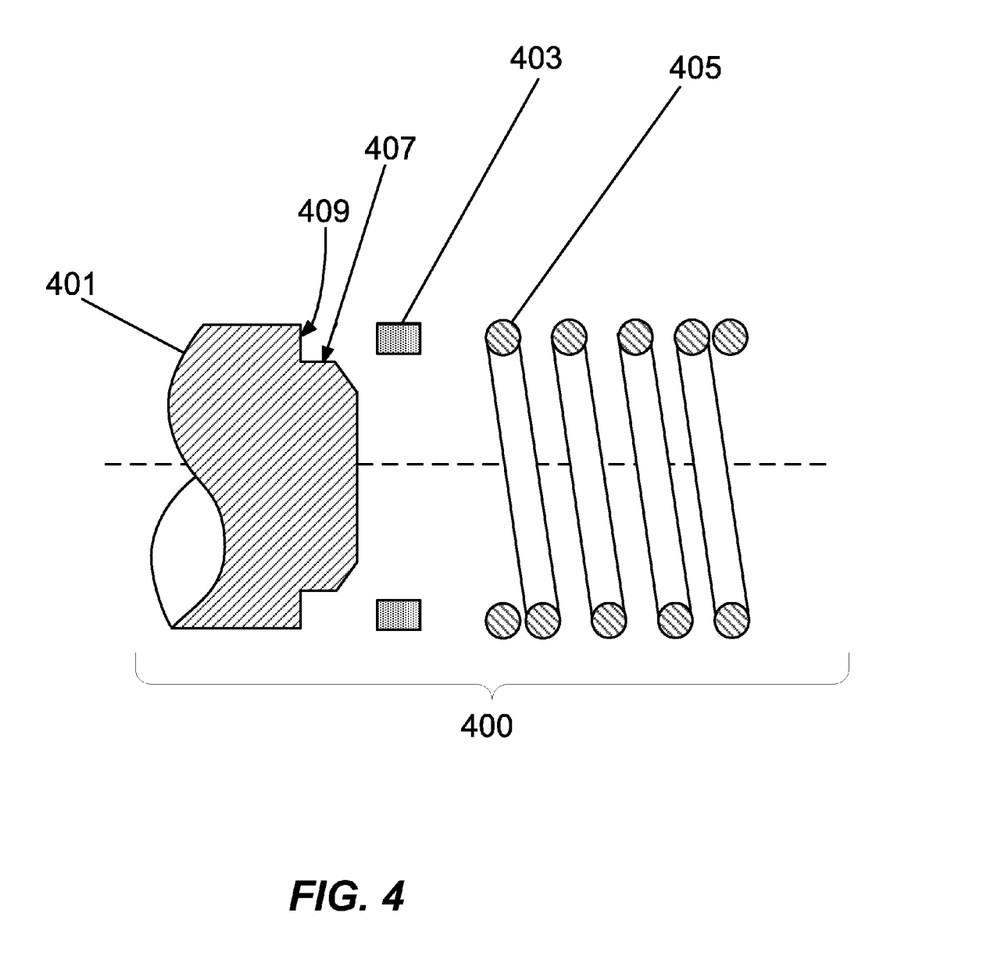
FIG. 4 is an exploded cross-sectional side view of a generator shaft end assembly 400 in which a charge dissipation device and configuration in keeping with the disclosed system are applied.

FIG. 4 is an exploded cross-sectional side view of a generator shaft end assembly 400 in which a charge dissipation device and configuration in keeping with the disclosed principles are applied. The shaft 401, end ring 403 and spring 405 are visible in this view. As can be seen, the shaft 401 has a partially-tapered reduced-diameter portion 407 at its free end, i.e., its end nearest the end ring 403. The partially-tapered reduced-diameter portion 407 serves to ensure that the end ring 403 and spring 405 remain centered on axis with respect to the free end of the shaft 401. A shoulder 409 is formed where the shaft 401 transitions from its normal diameter to the partially-tapered reduced-diameter portion 407 at the free end.

Although the spring 405 is illustrated as a compression coil spring, it will be appreciated that other spring types and configurations may be used instead. For example, a wave spring is capable of providing the same travel and spring constant in a shorter form compared to a coil spring with similar qualities, allowing for installations that are more compact. Alternatively, small leaf or finger-type spring elements may be used.

The end ring 403 is made of a conductive material, and in various implementations is made of a conductive metallic material having good wear resistance and at least moderate lubricity. In an embodiment, the end ring 403 is made of cast or machined gray iron. It will be appreciated that gray iron is typically an alloy of carbon, silicon, and iron, with the carbon being primarily in a graphitic form (i.e., in addition to the small amount of carbon incidentally included as pearlite in the iron matrix). Although gray iron has a lower tensile strength and lower ductility than many other alloys due to the presence of graphite mircoflakes, the presence of these flakes imparts certain properties to the alloy that make it especially suitable for the construction of the end ring 404. These properties include ease of casting, good machinability for production and finishing (even at wear-resisting hardness levels), dimensional stability under the frictional heating potentially experienced by the end ring 403, vibration absorption, and moderate lubricity. Thus, given that the end ring 403 may be subject to heat, compression, and abrasion, especially if outside lubrication fails, gray iron is a good material for accommodating both expected and unexpected loads with a minimum of deterioration or instability.

In a particular embodiment, the end ring 403 is formed to have a radially compressed friction fit within the end cap (not shown in FIG. 4), and is also biased against the shoulder 409 of the shaft 401 by spring 405. In this way, the end ring 403 is in contact with the housing (not shown in FIG. 4) and is also held in contact with the shaft 401, to form a conductive path between the two, enabling any accumulated charge to equalize. This effectively prevents the accumulation and sudden discharge of voltage across other elements of the machine in question.

With respect to spring 405, it will be appreciated that the spring 405 should be of sufficiently high constant, and should be installed in a sufficiently pre-compressed state, so as to provide enough force to keep the end ring 403 in contact with the shaft 401, and particularly the shaft shoulder 407. However, if the spring 405 is configured and installed in a manner that caused excessive force to be applied to the end ring 403, excessive wear to the end ring 403 and/or shoulder 407 may occur, and the end ring 403 may also be caused to spin within the housing. This phenomenon will cause excessive wear to the outer circumferential surface of the end ring 403, and may eventually lead to intermittent breaking of contact between the housing and the end ring 403.

In an embodiment, the end ring 403 is continually lubricated, e.g., by a flow of oil or the presence of grease, to prevent sticking, galling, or abrasion. The source of lubrication may be a dedicated source or may be shared with other components, such as nearby bushings or bearings.

Although the end ring 403 and spring 405 are illustrated separately in the exploded view of FIG. 4, these two elements are fixed together in a particular embodiment to provide ease of installation and removal, as well as to reduce the chance of having the end ring 403 spin during operation of the generator. Moreover, although the end ring 403 is illustrated with a rectangular cross-section, the cross-sectional shape of the end ring 403 may be varied based on ease of manufacture, shape of housing interior, or any other implementation-specific consideration. For example, the end ring 403 may be formed having a circular, ovoid, square, or other modified cross-section. Moreover, although the end ring 403 has been illustrated as a continuous one-piece part, it will be appreciated from the disclosed operation and function of the end ring 403 that a discontinuous and/or multi-part ring may also be used. For example, the end ring 403 may consist of a plurality of distinct, arcuate components.

Figure 5:
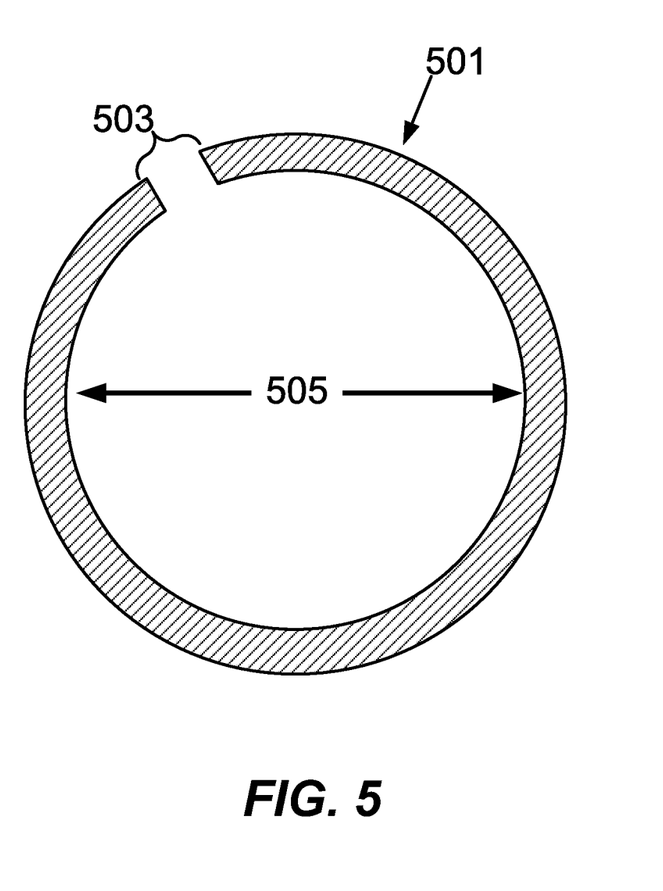
FIG. 5 is a frontal schematic view of a one-piece discontinuous end ring in keeping with an embodiment of the described shaft discharge system.

As an example, FIG. 5 shows a frontal schematic view of a one-piece discontinuous end ring 501. As can be seen, the end ring 501 is substantially continuous, but includes a small break or gap 503 at one point on its circumference. Although such a gap 503 need not serve a particular function, it will be appreciated that the gap 503 may be used to provide a wider tolerance range for the end ring 501 with respect to the inner diameter of the mating portion of the housing. Moreover, the greater degree of axial compressibility will allow the end ring 503 to compensate for wear along its outer circumferential surface during operation without requiring replacement. In this case, the inner diameter 505 of the end ring 501 should be sized so as to clear the shaft (not shown in FIG. 5) when the end ring 501 is in its most compressed state.

The material used for the conductive component in the foregoing examples has been described as gray iron. However, it will be appreciated that there are suitable alternatives that, although having inferior qualities in some regards, may have superior qualities in one or more other regards. For example, various types of steel, both stainless and otherwise, having various tempers and hardness values may be used, as may other conductive metals such as copper, brass, aluminum, and so on. Inexpensive conductive nonmetals such as graphite may also be used, although some such materials may suffer from excess wear and other problems.

In an embodiment, an upgrade kit is provided for applying the described system and method to a generator or motor that was previously ungrounded or in which shaft grounding was previously accomplished through other means. The upgrade kit will be discussed with reference to FIG. 3. In one embodiment, the kit includes a conductive end ring 311, an end cap 307, and a cylindrical spring 313. The kit may further include a sealing ring 315, e.g., of polymeric or metallic construction, to seal the end cap 307 to the housing 305 when installed.

The shaft grounding upgrade kit is applied to the free end of the rotating shaft 301 to ground the shaft 301 to the surrounding stationary generator housing 305. The conductive end ring 311 is formed with a diameter that is approximately the same as the inner diameter of the end cap 307. The cylindrical spring 313 has a diameter that is substantially the same as the diameter of the end ring 311, such that the spring 313 uniformly contacts the end ring 311 surface. The spring 313 has a spring constant selected such that compression of the spring 313 against the end ring 311 within the housing 305 and/or end cap 307 (when the end ring 311, spring 313, and shaft 301 are coaxially placed) will hold the ring 311 in contact with the shaft 301 and the housing 305 such that the end ring 311 remains rotationally stationary with respect to the housing 305. With these components installed such that the spring 313 is appropriately compressed, the shaft 301 is grounded to the housing 305, and damaging discharge is eliminated.

In one aspect, a spur, key, or keyway is provided on the end ring 311 to prevent rotation of the end ring 311 with respect to the housing 305 or end cap 307. The provided spur, key, or keyway is shaped to mate or interfere with a counterpart structure on the housing 305 or end cap 307 (e.g., a channel, key or protrusion) to fix the end ring 305 about its primary axis.

INDUSTRIAL APPLICABILITY

The described system and method are applicable to machines and devices wherein a spinning shaft can potentially become charged relative to a nearby element, such as a housing or casing. Moreover, the possibility of a damaging electrical discharge at the peak of such charge accumulation is addressed by the illustrated system in its various embodiments, both as shown and as are apparent from this description and accompanying drawings. Examples of machines and devices that pose a risk of damaging shaft charging and discharging include many types of electric motors and electric generators.

In this context, the disclosed system facilitates an equalization of charge between the shaft and housing, or casing, thus preventing gradual charge accumulation and sudden electrical discharge through sensitive machine components. Moreover, the configuration of the described system is such that it alleviates the excessive space requirements and high complexity of many existing systems, allowing for economical production, installation, and maintenance or replacement of the system.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, and not to entirely exclude such from the scope of the disclosure unless otherwise indicated.

Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. An assembly for dissipating an electrical charge on a shaft at least partially encompassed by a stationary housing, wherein the housing and the shaft are separated by one or more bearings facilitating rotation of the shaft on an axis, the assembly comprising:
    an annular conductive charge-dissipating component, separate from the one or more bearings; and
    a biasing element oriented to apply, while the shaft is rotating on the axis, a force to:
        the annular conductive charge-dissipating component, relative to the shaft, such that the annular conductive charge-dissipating component is held in substantially continuous contact with a rotating surface of the shaft, and
        the housing.

2. The assembly according to claim 1, further comprising a shoulder formed on the shaft at the rotating surface where the annular conductive charge-dissipating component is in substantially continuous contact with the shaft, the shoulder being sized and shaped to receive the annular conductive charge-dissipating component.

3. The assembly according to claim 1, wherein the biasing element is a compression coil spring having an outer diameter substantially the same as an outer diameter of the annular conductive charge-dissipating component and being coaxial with the shaft.

4. The assembly according to claim 1, wherein the biasing element is a compression wave spring having an outer diameter substantially the same as an outer diameter of the annular conductive charge-dissipating component and being coaxial with the shaft.

5. The assembly according to claim 1, wherein the annular conductive charge-dissipating component consists of gray iron.

6. The assembly according to claim 1, wherein the annular conductive charge-dissipating component comprises at least one of the group consisting of: steel, copper, brass, and aluminum.

7. The assembly according to claim 1, wherein the shaft and stationary housing form at least a portion of an electrical generator.

8. The assembly according to claim 1, wherein the shaft and stationary housing form at least a portion of an electrical motor.

9. The assembly according to claim 1, wherein the annular conductive charge-dissipating component is open at one or more locations about its circumference.

10. The assembly according to claim 1, wherein the annular conductive charge-dissipating component consists of a plurality of distinct arcuate components.

11. The assembly according to claim 1, wherein the annular conductive charge-dissipating component has a cross-sectional shape selected from the group consisting of circular, ovoid, square, and rectangular.

12. The assembly according to claim 1, further including a source of lubrication for providing lubrication between the annular conductive charge-dissipating component and the rotating surface of the shaft.

13. The assembly according to claim 12, wherein the annular conductive charge-dissipating component is compression fit within the housing.

14. The assembly according to claim 1, wherein the annular conductive charge-dissipating component, the housing and the biasing element are configured and sized such that the annular conductive charge-dissipating component remains stationary relative to the housing during rotation of the shaft.

15. The assembly according to claim 1, wherein the housing is electrically grounded.

16. The assembly according to claim 1, wherein the annular conductive charge-dissipating component and the biasing element are fixed together in a coaxial relationship.

17. A method for grounding a shaft that is rotationally supported, for rotation of the shaft on an axis, by one or more bearings within a grounded housing, the shaft having a free end, the method comprising:
- positioning a conductive ring, separate from the one or more bearings, within the housing proximal to the free end of the shaft, the conductive ring being coaxial with the shaft and being in conductive contact with the housing;
- placing a biasing element within the housing, such that the conductive ring lies between the biasing element and the free end of the shaft, the biasing element being coaxial with the conductive ring and the shaft; and
- compressing the biasing element against the conductive ring such that the ring is biased against a rotating surface of the free end of the shaft during rotation of the shaft on the axis, while remaining in conductive contact with the housing, thus grounding the shaft to the housing while the shaft is rotating.

18. The method according to claim 17, wherein the conductive ring consists of gray iron.

19. A shaft grounding upgrade kit for application to a free end of a shaft, that is rotationally supported, for rotation of the shaft on an axis, by one or more bearings, in order to ground the shaft to a surrounding stationary housing, the housing having a portion surrounding the free end of the shaft and having an inside diameter at that portion, the kit comprising:
- a conductive ring member, separate from the one or more bearings, having a diameter that is approximately equal to the primary diameter of the housing;
- a cylindrical spring having a diameter that is as approximately equal to the diameter of the conductive ring member; and
- an end cap having a cylindrical opening for containing the cylindrical spring such that when the end cap is installed on the surrounding stationary housing:
  - the conductive ring member, cylindrical spring, and shaft are located in a mutually coaxial relationship, and
  - the spring is compressed against:
    - the conductive ring member to hold the ring in substantially continuous contact with a rotating face of the shaft during rotation of the shaft, and
    - the housing, such that the conductive ring member remains rotationally stationary with respect to the housing during rotation of the shaft.

20. The shaft grounding upgrade kit according to claim 19, wherein the conductive ring member comprises gray iron and the cylindrical spring is one of the group consisting of: a wave spring and a coil spring.

* * * * *